(12) United States Patent
Gohr et al.

(10) Patent No.: US 7,288,579 B2
(45) Date of Patent: *Oct. 30, 2007

(54) METHOD FOR REDUCING HAZE IN A FIRE RESISTANT POLYCARBONATE COMPOSITION

(75) Inventors: Eric Thomas Gohr, Evansville, IN (US); Niles Richard Rosenquist, Evansville, IN (US); Rajendra Kashinath Singh, Evansville, IN (US); Gregory James Stoddard, Evansville, IN (US); Shahrzad Zarkoob, San Jose, CA (US); Johannes Martinus Dina Goossens, Bergen op Zoom (NL)

(73) Assignee: General Electric Company, Schenectady, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/740,074

(22) Filed: Dec. 17, 2003

(65) Prior Publication Data

US 2004/0132865 A1 Jul. 8, 2004

Related U.S. Application Data

(63) Continuation of application No. 09/749,645, filed on Dec. 27, 2000, now Pat. No. 6,730,720.

(51) Int. Cl.
*C08J 3/22* (2006.01)
(52) U.S. Cl. ...................................... 523/351
(58) Field of Classification Search ................ 523/351
See application file for complete search history.

(56) References Cited

U.S. PATENT DOCUMENTS

| 3,635,895 A | 1/1972 | Kramer |
|---|---|---|
| 3,775,367 A | 11/1973 | Nouvertne |
| 3,971,756 A | 7/1976 | Bialous et al. |
| 4,001,184 A | 1/1977 | Scott |
| 4,028,297 A | 6/1977 | Webb |
| 4,110,299 A | 8/1978 | Mark |
| 4,130,530 A | 12/1978 | Mark et al. |
| 4,217,438 A | 8/1980 | Brunelle et al. |
| 4,303,575 A | 12/1981 | Reinert |
| 4,335,038 A | 6/1982 | Thomas |
| 4,552,911 A | 11/1985 | Cohnen et al. |
| 4,916,194 A | 4/1990 | Policastro et al. |
| 5,041,479 A | 8/1991 | Ogoe |
| 5,218,027 A | 6/1993 | Smith et al. |
| 5,399,600 A | 3/1995 | Buysch et al. |
| 5,449,710 A * | 9/1995 | Umeda et al. ............... 524/165 |
| 5,508,323 A | 4/1996 | Romenesko et al. |
| 5,663,280 A | 9/1997 | Ogoe et al. |
| 6,353,046 B1 | 3/2002 | Rosenquist et al. |

FOREIGN PATENT DOCUMENTS

| EP | 0374816 A2 | 6/1990 |
|---|---|---|
| EP | 0625547 A1 | 11/1994 |
| WO | WO 0046299 A | 8/2000 |

OTHER PUBLICATIONS

International Search Report, Mailed Jul. 2, 2002.

* cited by examiner

*Primary Examiner*—Peter Szekely

(57) ABSTRACT

A method to reduce haze in the production of fire resistant polycarbonate compositions comprising flame retardant salts, wherein the salt is blended with a first polycarbonate to form a concentrate, and the concentrate is then added to a second polycarbonate resin.

11 Claims, No Drawings

METHOD FOR REDUCING HAZE IN A FIRE RESISTANT POLYCARBONATE COMPOSITION

CROSS-REFERENCE TO RELATED APPLICATIONS

This application is a continuation of U.S. application Ser. No. 09/749,645 filed on Dec. 27, 2000, now U.S. Pat. No. 6,730,720 which is hereby incorporated by reference in its entirety.

BACKGROUND OF THE INVENTION

This invention relates to methods of producing transparent, fire resistant polycarbonate compositions and more particularly transparent, fire resistant polycarbonate compositions comprising flame retardant salts.

Plastics, and in particular polycarbonates, are increasingly being used to replace metals in a wide variety of applications, from car exteriors to aircraft interiors. The use of polycarbonate instead of metal decreases weight, improves sound dampening, and makes assembly of the device easier. Unfortunately, polycarbonates are inherently flammable, and thus require the addition of flame retardants. A variety of different materials have been used, some of which are set forth in U.S. Pat. Nos. 3,971,756 4,028,297, 4,110,299, 4,130,530, 4,303,575, 4,335,038, 4,552,911, 4,916,194, 5,218,027, and 5,508,323. The challenge is to identify economical, environmentally friendly flame retardant additives that provide the requisite flame resistance, but without compromising desirable polycarbonate properties such as strength and clarity.

Flame resistance in polycarbonate compositions may be achieved using a sulfonic acid salt such as potassium perfluorobutane sulfonate (also known as "Rimar salt", or "KPFBS") as disclosed, for example, in U.S. Pat. No. 3,775,367. While flame resistant, transparent polycarbonate compositions may be produced using KPFBS, optimum flame resistance is found for levels of salt that can result in haze, especially for thicker samples. The amount of flame retardant that can be added when an optically clear product is desired is thus limited. Addition of synergistic additives such as tetrabromobisphenol A to improve flame retardancy is not possible where "ECO-friendly" standard that prohibit the inclusion of bromine or chlorine are in place. Accordingly, there remains a need in the art for methods of producing polycarbonates that are not only highly flame resistant, but also transparent.

BRIEF SUMMARY OF THE INVENTION

The above discussed and other drawbacks and deficiencies of the prior art are overcome or alleviated by a method for reducing haze in fire resistant polycarbonate compositions, comprising
blending a flame retardant salt with a first polycarbonate to produce a concentrate; and,
blending the concentrate with a second polycarbonate to form a transparent, fire resistant polycarbonate composition.

DETAILED DESCRIPTION OF THE PREFERRED EMBODIMENTS

It has surprisingly been found that highly flame resistant and transparent polycarbonate compositions may be obtained by blending a flame retardant salt with a first polycarbonate to produce a concentrate, then blending the concentrate with a second polycarbonate to form a transparent, fire resistant polycarbonate composition. The concentrate is preferably a pelletized blend of KPFBS and polycarbonate. In another preferred embodiment, the first polycarbonate and the second polycarbonate are the same.

Not wishing to be bound by any theory, it is believed that the present method of using the flame retardant salt-polycarbonate concentrate aids in completely dissolving the salt into the final polycarbonate composition by giving the salt crystals an additional heat history. The additional heat history may allow for effectively solubilizing greater amounts of salt into the matrix. The present method allows for the use of higher levels of flame retardant salt, thereby providing robust flame performance while at the same time maintaining polymer transparency.

Non-limiting examples of suitable sulfonic acid salts are perfluoroalkane sulfonate alkali metal, $C_1$-$C_6$ alkylammonium, or ammonium salts. Such salts are described in the above-mentioned U.S. Pat. No. 3,775,367, and include, for example, salts such as sodium, potassium, or tetraethyl ammonium perfluoromethylbutane sulphonate; sodium, potassium, or tetraethyl ammonium perfluoromethane sulphonate; sodium, potassium, or tetraethyl ammonium perfluoroethane sulphonate; sodium, potassium, or tetraethyl ammonium perfluoropropane sulphonate; sodium, potassium, or tetraethyl ammonium perfluorohexane sulphonate; sodium, potassium, or tetraethyl ammonium perfluoroheptane sulphonate; sodium, potassium, or tetraethyl ammonium perfluorooctanesulphonate; sodium, potassium, or tetraethyl ammonium perfluorobutane sulfonate; and sodium, potassium, or tetraethyl ammonium diphenylsulfone-sulphonate; and mixtures comprising at least one of the foregoing salts. Potassium perfluorobutane sulfonate (KPFBS) and potassium diphenylsulfon-3-sulphonate (KSS) are particularly preferred.

The salt, and KPFBS in particular, is present in the final composition in quantities effective to achieve a flame resistance rating of UL94-V0 at 3.2 millimeters. Generally, effective amounts of flame retardant salt present in the final composition is about 0.01 to about 1.0, preferably about 0.05 to about 0.20, and most preferably about 0.06 to about 0.12, and even more preferably 0.08-0.10% by weight based upon the total weight of the resin in the final composition. To achieve these final concentrations, it is convenient to produce a concentrate wherein the amount of flame retardant salt in the concentrate is about 0.1 to about 5.0, preferably about 0.5 to about 2.0, and most preferably about 0.8 to about 1.2% by weight of the total amount of the concentrate.

The polycarbonate component may be made by interfacial processes or by catalytic transesterification, may be either branched or linear in structure, and may include functional substituents. As used herein, the terms "polycarbonate" and "polycarbonate composition" includes compositions having structural units of the formula (I):

(I)

in which at least about 60 percent of the total number of $R^1$ groups are aromatic organic radicals and the balance thereof are aliphatic, alicyclic, or aromatic radicals. Preferably, $R^1$ is an aromatic organic radical and, more preferably, a radical of the formula (II):

$$-A^1-Y^1-A^2-\qquad(II)$$

wherein each of $A^1$ and $A^2$ is a monocyclic divalent aryl radical and $Y^1$ is a bridging radical having one or two atoms which separate $A^1$ from $A^2$. In an exemplary embodiment, one atom separates $A^1$ from $A^2$. Illustrative non-limiting examples of radicals of this type are —O—, —S—, —S(O)—, —S(O)$_2$—, —C(O)—, methylene, cyclohexylmethylene, 2-[2.2.1]-bicycloheptylidene, ethylidene, isopropylidene, neopentylidene, cyclohexylidene, cyclopentadecylidene, cyclododecylidene, and adamantylidene. The bridging radical $Y^1$ can be a hydrocarbon group or a saturated hydrocarbon group such as methylene, cyclohexylidene or isopropylidene.

Polycarbonates can be produced by the interfacial reaction of dihydroxy compounds in which only one or two atoms separate $A^1$ and $A^2$. As used herein, the term "dihydroxy compound" includes, for example, bisphenol compounds having general formula (III) as follows:

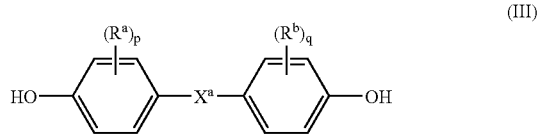

wherein $R^a$ and $R^b$ each represent a monovalent hydrocarbon group and may be the same or different; p and q are each independently integers from 0 to 4; and $X^a$ represents one of the groups of formula (IV):

wherein $R^c$ and $R^d$ each independently represent a hydrogen atom or a monovalent linear or cyclic hydrocarbon group and $R^e$ is a divalent hydrocarbon group.

Some illustrative, non-limiting examples of suitable dihydroxy compounds include the dihydroxy-substituted aromatic hydrocarbons disclosed by name or formula (generic or specific) in U.S. Pat. No. 4,217,438, which is incorporated herein by reference. A nonexclusive list of specific examples of the types of bisphenol compounds that may be represented by formula (III) includes the following:
1,1-bis(4-hydroxyphenyl) methane;
1,1-bis(4-hydroxyphenyl) ethane;
2,2-bis(4-hydroxyphenyl) propane (hereinafter "bisphenol A" or "BPA");
2,2-bis(4-hydroxyphenyl) butane;
2,2-bis(4-hydroxyphenyl) octane;
1,1-bis(4-hydroxyphenyl) propane;
1,1-bis(4-hydroxyphenyl) n-butane;
bis(4-hydroxyphenyl) phenylmethane;
2,2-bis(4-hydroxy-1-methylphenyl) propane;
1,1-bis(4-hydroxy-t-butylphenyl) propane;
2,2-bis(4-hydroxy-phenyl) propane;
1,1-bis(4-hydroxyphenyl) cyclopentane; and
1,1-bis(4-hydroxyphenyl) cyclohexane.

It is also possible to employ two or more different dihydric phenols or a copolymer of a dihydric phenol with a glycol or with a hydroxy- or acid-terminated polyester or with a dibasic acid or hydroxy acid in the event a carbonate copolymer rather than a homopolymer is desired for use. Polyarylates and polyester-carbonate resins or their blends can also be employed. Branched polycarbonates are also useful, as well as blends of linear polycarbonate and a branched polycarbonate. The branched polycarbonates may be prepared by adding a branching agent during polymerization.

These branching agents are well known and may comprise polyfunctional organic compounds containing at least three functional groups, which may be hydroxyl, carboxyl, carboxylic anhydride, and mixtures thereof. Specific examples include trimellitic acid, trimellitic anhydride, trimellitic trichloride, tris-p-hydroxy phenyl ethane, isatin-bisphenol, tris-phenol TC (1,3,5-tris((p-hydroxyphenyl)isopropyl)benzene), tris-phenol PA (4(4(1,1-bis(p-hydroxyphenyl)-ethyl) alpha, alpha-dimethyl benzyl) phenol, trimesic acid and benzophenone tetracarboxylic acid. The branching agents may be added at a level of about 0.05-2.0 weight percent. Branching agents and procedures for making branched polycarbonates are described in U.S. Pat. Nos. 3,635,895 and 4,001,184, which are incorporated by reference. All types of polycarbonate end groups are contemplated as being within the scope of the present invention.

Preferred polycarbonates are based on bisphenol A, in which each of $A^1$ and $A^2$ is p-phenylene and $Y^1$ is isopropylidene. Preferably, the average molecular weight of the polycarbonate is in the range of about 5,000 to about 100,000, more preferably in the range of about 10,000 to about 65,000, and most preferably in the range of about 15,000 to about 35,000. Furthermore the polycarbonate has a melt viscosity rate (MVR) of about 4 to about 30 cm$^3$/10 min.

Additionally, the polycarbonate composition may include various additives ordinarily incorporated in resin compositions of this type. Such additives are, for example, fillers or reinforcing agents; heat stabilizers; antioxidants; light stabilizers; plasticizers; antistatic agents; mold releasing agents; additional resins; and blowing agents. Examples of fillers or reinforcing agents include glass fibers, asbestos, carbon fibers, silica, talc, and calcium carbonate. Examples of heat stabilizers include triphenyl phosphite, tris-(2,6-dimethylphenyl)phosphite, tris-(mixed mono-and di-nonylphenyl)phosphite, dimethylbenzene phosphonate, tris-(2,4-di-t-butylphenyl)phosphite, and trimethyl phosphate. Examples of antioxidants include octadecyl-3-(3,5-di-tert-butyl-4-hydroxyphenyl)propionate, and pentaerythrityl-tetrakis[3-(3,5-di-tert-butyl-4-hydroxyphenyl)propionate].

Examples of light stabilizers include 2-(2-hydroxy-5-methylphenyl)benzotriazole, 2-(2-hydroxy-5-tert-octylphenyl)-benzotriazole and 2-hydroxy-4-n-octoxy benzophenone. Examples of plasticizers include dioctyl-4,5-epoxy-hexahydrophthalate, tris-(octoxycarbonylethyl)isocyanurate, tristearin and epoxidized soybean oil. Examples of the antistatic agent include glycerol monostearate, sodium stearyl sulfonate, and sodium dodecylbenzenesulfonate. Examples of mold releasing agents include stearyl stearate, pentaerythritol tetrastearate, beeswax, montan wax and paraffin wax. Examples of other resins include but are not limited to polypropylene, polystyrene, polymethyl methacrylate, and polyphenylene oxide. Combinations of any of the foregoing additives may be used. Such additives may be mixed at a suitable time during the mixing of the components for forming the composition. A preferred time is during the blending of the concentrate and the second polycarbonate.

In particular, other flame retarding components may be present in the compositions, for example cyclic siloxanes, at levels effective to impart improved fire-resistance properties. Suitable quantities will generally be in the range of about 0.01 to about 0.5 parts per hundred parts by weight of resin (phr), preferably about 0.02 to about 0.30 phr. Suitable cyclic siloxanes, which may be present, include those having the general formula (V)

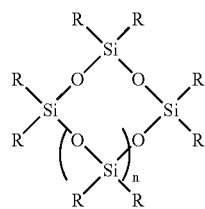

(V)

wherein n is 0-7 and each R is independently an alkyl group having from 1 to about 36 carbons, an alkoxy group having from 1 to about 36 carbons, a fluorinated or perfluorinated alkyl or alkoxy group having from 1 to about 36 carbons, an arylalkoxy group having from 7 to about 36 carbons, an aryl group having from 6 to about 14 carbons, an aryloxy group having from 6 to about 14 carbons, a fluorinated or perfluorinated aryl group having from 6 to about 14 carbons, and an alkylaryl group having from 7 to about 36 carbons. Specific examples of cyclic siloxanes include but are not limited to octaphenylcyclotetrasiloxane, hexamethylcyclotrisiloxane, octamethylcyclotetrasiloxane, decamethylcyclopentasiloxane, dodecamethylcyclohexasiloxane, trimethyltriphenylcyclotrisiloxane, and tetramethyltetraphenylcyclotetrasiloxane.

In the practice of the process, the flame retardant salt is blended with a first polycarbonate to form a concentrate that is an intimate blend. The concentrate is further blended with a second polycarbonate to produce a final intimate blend. Such conditions resulting in an intimate blend often include mixing in single or twin-screw type extruders or similar mixing devices well known in the art, which can apply shear to the components. It is often advantageous to apply a vacuum to the melt through at least one or more vent ports in the extruder to remove volatile impurities in the composition.

In a preferred embodiment, the concentrate is pelletized. The first polycarbonate and flame retardant salt blend is pumped in molten form through a strand die to a water bath and pelletizer. The pelletized concentrate is then further blended with a second polycarbonate.

Those of ordinary skill in the art will be able to adjust blending times and temperatures, as well as component addition, without undue additional experimentation.

The invention is further illustrated by the following non-limiting Examples.

EXAMPLES

The following examples were prepared according to the formulations listed in Tables 1 and 2. All amounts are weight percent based on the total resin weight unless otherwise indicated.

Laboratory scale comparative examples (e.g., Example 1, Table 1) were made by powder blending the components in the amounts indicated in Table 1, followed by feeding the blend to a twin screw extruder operated at 300° C. and about 20 kg/hr. The extruded strands were cut into pellets and the pellets were injection molded at 285 to 300° C. into appropriate test samples for the testing.

The masterbatch comprising KPFBS in accordance with the present invention was prepared using the same procedure, except that the formulation comprised 99% of the lower molecular weight polycarbonate resin and 1% of the KPFBS. Laboratory scale examples (e.g., Example 2, Table 1) in accordance with the present invention were also prepared using the same procedure, except that as indicated, the KPFBS of the comparative examples was replaced in the blend fed to the extruder with the pelletized master batch of KPFBS containing the equivalent quantity of KPFBS as in the comparative example.

Melt volume ratio (MVR) of the examples was measured on 1.2 kilogram at 300° C. in accordance with ASTM D1238.

After conditioning samples for 2 days at 23° C., 50% relative humidity, flammability tests on 3.2 mm thick samples were performed following the procedure of Underwriter's Laboratory Bulletin 94 entitled "Tests for Flammability of Plastic Materials, UL94". Four sets of five samples for each formulation were tested. According to UL 94, the materials were classified as UL94 V-0, UL94 V-1, or UL94 V-2.

Yellowness Index (YI) for laboratory scale samples was measured in accordance with ASTM D1925. Transparency is described by two parameters, percent transmission and percent haze. Percent transmission and percent haze for laboratory scale samples were determined using ASTM D1003.

TABLE 1

| Component | Example 1* | Example 2 |
|---|---|---|
| Polycarbonate resin, MW 21,800 | 64.35 | 54.45 |
| Polycarbonate resin, MW 30,500 | 35 | 35 |
| Octaphenyltetrasiloxane | 0.1 | 0.1 |
| Pentaerythritol stearate | 0.35 | 0.35 |
| KPFBS | 0.1 | — |
| Phosphite stabilizer | 0.1 | 0.1 |
| Concentrate (1 wt. % KPFBS) | — | 10 |
| Properties | | |
| MVR | 15.1 | 15.2 |
| % Transmittance (2.5 mm) | 90.5 | 90.7 |
| YI (2.5 mm) | 1.6 | 1.5 |
| Haze | 1 | 0.9 |
| % Transmittance (3.2 mm) | 90.2 | 90.5 |
| YI (3.2 mm) | 1.9 | 1.7 |
| Haze (3.2 mm) | 1.6 | 0.7 |
| UL-94 (3.2 mm) | V-0 | V-0 |

*Comparative

Haze is often exacerbated for thicker samples. As can be seen by reference to the above data, haze for samples at 3.2 mm show significant improvement over the control.

In addition to the haze reduction, the thicker section runners from the moldings were observed to exhibit bubbles, with the invention example exhibiting the least bubbles. On a scale of 1 (no bubbles) to 10 (runner completely covered with bubbles) the example of the invention had a rating of 1 and the comparative example had a rating of 7.

Manufacturing scale examples (e.g., Comparative example 3, Table 2) were prepared by making a uniform powder blend of 80 kg of the lower molecular weight polycarbonate resin with the quantities of KPFBS, octaphenyltetrasiloxane, pentaerythritol tetrastearate, phosphite stabilizer, and pigments listed in Table 2. The blend was fed to a 75 mm twin-screw extruder at a 4.7% ratio simultaneously with 100% of the lower MW polycarbonate resin of Table 2 at 44.6% ratio and 100% of the higher MW polycarbonate resin of Table 2 at 50.7% ratio to yield an overall batch size of 2000 kg of the formulation of Table 2. The blend was extruded at a temperature setting from 200° C. to 280° C. into strands and the strands cut into pellets. The pellets were subsequently injection molded at 302 to 307° C. into plaques 4.5 mm in thickness.

The Master batch of KPFBS was prepared essentially in the same manner as described above for Comparative example 3, except that the uniform powder blend consisted of 11.0 Kg of KPFBS and 85 kg of the lower MW polycarbonate resin, which was fed to the extruder at a ratio of 8.7% simultaneously with 100% of the lower MW polycarbonate resin at a 91.3% ratio to yield an overall batch size of 1101 kg.

Manufacturing scale examples in accordance with the present invention (e.g., Example 4 of Table 2) were prepared by making a uniform powder blend of 78 kg of the lower molecular weight polycarbonate resin of Table 2 with the quantities of octaphenyltetrasiloxane, pentaerythritol tetrastearate, phosphite stabilizer and pigment and stabilizers listed in Table 2. The blend was fed to a 75 mm twin screw extruder at a 7.14% ratio simultaneously with the KPFBS master batch pellets at a 7.94% ratio, 100% of the lower MW polycarbonate resin at 44.68% ratio and 100% of the higher MW polycarbonate resin at a 40.24% ratio to yield an overall batch size of 1200 kg of the formulation of Table 2. The blend was extruded at temperature setting from 200 C. to 280° C. into strands and the strands cut into pellets. The pellets were subsequently injection molded at 302 to 307° C. into plaques 4.5 mm in thickness.

Haze measurements for manufacturing scale samples were performed on a Macbeth Spectrophotometer, Model COLOR-EYE 7000, manufactured by Macbeth, a division of Kollmorgen Instruments Corp., New York. Before the actual measurement, the spectrophotometer was calibrated by using an ultraviolet filter to filter the 340-400 nm spectral region, and then placing the ZERO calibration standard followed by the WHITE calibration standard (ceramic) in the viewport. After calibration, haze measurements were performed on 4.5 mm thick chips by placing the samples in the viewport. Three chips of each sample were made and haze measurements were done twice on each of the three chips of a particular sample. The final output provides a percent haze number relative to the ZERO and the WHITE calibration standards.

TABLE 2

| Component | Example 3* | | Example 4 | |
|---|---|---|---|---|
| | Kg | % | Kg | % |
| Polycarbonate resin, MW 21,800 | 971.7 | 48.6 | 536.2 | 44.7 |
| Polycarbonate resin, MW 30,500 | 1015 | 50.75 | 560.9 | 46.7 |

TABLE 2-continued

| Component | Example 3* | | Example 4 | |
|---|---|---|---|---|
| | Kg | % | Kg | % |
| Octaphenyltetrasiloxane | 2.0 | 0.1 | 1.19 | 0.1 |
| Pentaerythritol stearate | 6.94 | 0.347 | 4.17 | 0.347 |
| KPFBS | 1.6 | 0.08 | — | — |
| Phosphite stabilizer | 1.8 | 0.09 | 1.07 | 0.09 |
| Concentrate (1 wt. % KPFBS) | — | — | 95.3 | 7.94 |

*Comparative Example

Percent haze in 12 pelletized samples prepared by the method of comparative example 3 was found to be in the range from 1.58 to 4.59, average of 3.13, with a standard deviation of 0.87. Percent haze for 9 samples formed by the method of Example 4 was found to be in the range from 0.51 to 1.23, average of 0.71, with a standard deviation of 0.23.

While preferred embodiments have been shown and described, various modifications and substitutions may be made thereto without departing from the spirit and scope of the invention. Accordingly, it is to be understood that the present invention has been described by way of illustration and not limitation.

What is claimed is:

1. A method for reducing haze in fire resistant polycarbonate compositions, comprising:
    blending flame retardant salt with a first polycarbonate to produce a concentrate, wherein the flame retardant salt comprises a $C_1$-$C_6$ alkylammonium salt;
    pelletizing the concentrate; and,
    blending the pelletized concentrate with a second polycarbonate and a cyclic siloxane to form a fire resistant polycarbonate composition.

2. The method of claim 1, wherein the flame retardant salt is selected from the group consisting of tetrabutyl ammonium perfluoromethylbutane sulphonate, tetrabutyl ammonium perfluoromethane sulphonate, tetrabutyl ammonium perfluoroethane sulphonate, tetrabutyl ammonium perfluoropropane sulphonate, tetrabutyl ammonium perfluorohexane sulphonate, tetrabutyl ammonium perfluoroheptane sulphonate, tetrabutyl ammonium perfluorooctane sulphonate, tetrabutyl ammonium perfluorobutane sulphonate, tetrabutyl ammonium diphenylsulfone sulphonate, and mixtures comprising at least one of the foregoing flame retardant salts.

3. The method of claim 1, wherein the flame retardant salt is selected from the group consisting of tetraethyl ammonium perfluoromethylbutane sulphonate, tetraethyl ammonium perfluoromethane sulphonate, tetraethyl ammonium perfluoroethane sulphonate, tetraethyl ammonium perfluoropropane sulphonate, tetraethyl ammonium perfluorohexane sulphonate, tetraethyl ammonium perfluoroheptane sulphonate, tetraethyl ammonium perfluorooctane sulphonate, tetraethyl ammonium perfluorobutane sulphonate, tetraethyl ammonium diphenylsulfone sulphonate, and mixtures comprising at least one of the foregoing flame retardant salts.

4. The method of claim 1, wherein the flame retardant salt is present in the concentrate in an amount from about 0.10 to about 5.0 weight percent based upon the total weight of the concentrate.

5. The method of claim 1, wherein the first polycarbonate is the same as the second polycarbonate.

6. The method of claim 1, wherein the flame retardant salt is present in the fire resistant polycarbonate composition in amounts of about 0.01 to about 1.0 weight percent based upon the total weight of the polycarbonate.

7. The method of claim 1, further comprising blending with the concentrate and the second polycarbonate, a filler, a reinforcing agent, a heat stabilizer, an antioxidant, a light stabilizer, a plasticizer; an antistatic agent, a mold releasing agent, an additional resin, a blowing agent or combinations comprising at least one of the foregoing.

8. The method of claim 1, wherein the cyclic siloxane is present in the flame resistant polycarbonate composition in an amount from about 0.01 to about 0.5 parts per hundred parts by weight of the first polycarbonate and the second polycarbonate.

9. The method of claim 1, wherein the cyclic siloxane has the general formula (V)

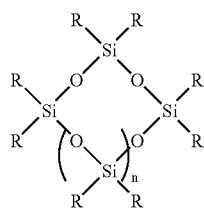

(V)

wherein n is 0-7 and each R is independently an alkyl group having from 1 to about 36 carbons, an alkoxy group having from 1 to about 36 carbons, a fluorinated or perfluorinated alkyl or alkoxy group having from 1 to about 36 carbons, an arylalkoxy group having from 7 to about 36 carbons, an aryl group having from 6 to about 14 carbons, an aryloxy group having from 6 to about 14 carbons, a fluorinated or perfluorinated aryl group having from 6 to about 14 carbons, or an alkylaryl group having from 7 to about 36 carbons.

10. The method of claim 1, wherein the cyclic siloxane is octaphenylcyclotetrasiloxane, hexamethylcyclotrisiloxane, octamethylcyclotetrasiloxane, decamethylcyclopentasiloxane, dodecamethylcyclohexasiloxane, trimethyltriphenylcyclotrisiloxane, or tetramethyltetraphenylcyclotetrasiloxane.

11. The method of claim 1, wherein the cyclic siloxane comprises octaphenylcyclotetrasiloxane.

* * * * *